H. T. GOSS.
DISH WASHING MACHINE.
APPLICATION FILED MAR. 11, 1912.
1,042,784.
Patented Oct. 29, 1912.
2 SHEETS—SHEET 2.
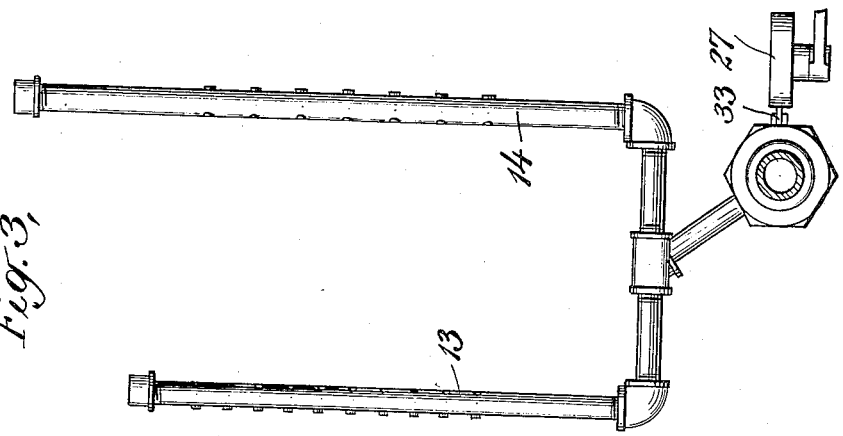
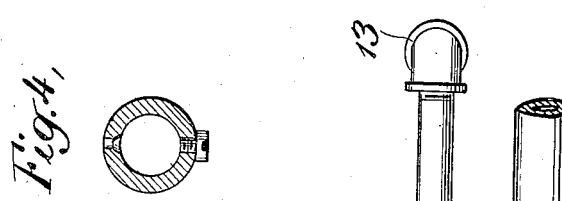
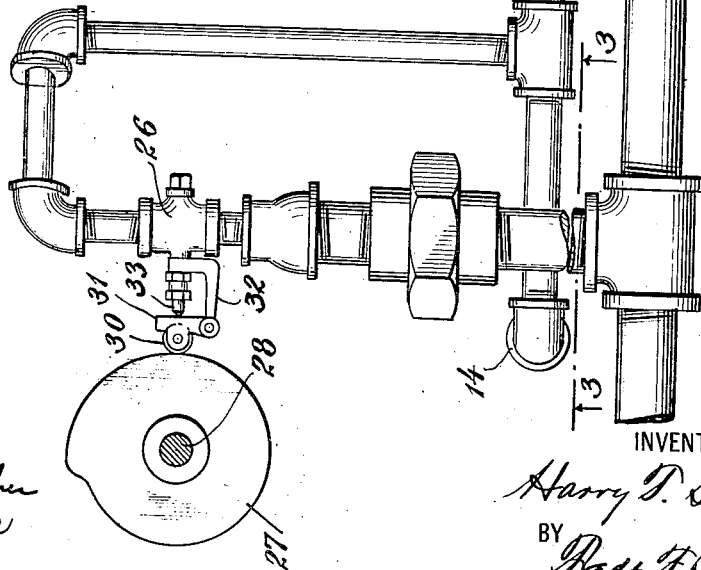
WITNESSES:
INVENTOR
Harry T. Goss.
BY
ATTORNEY

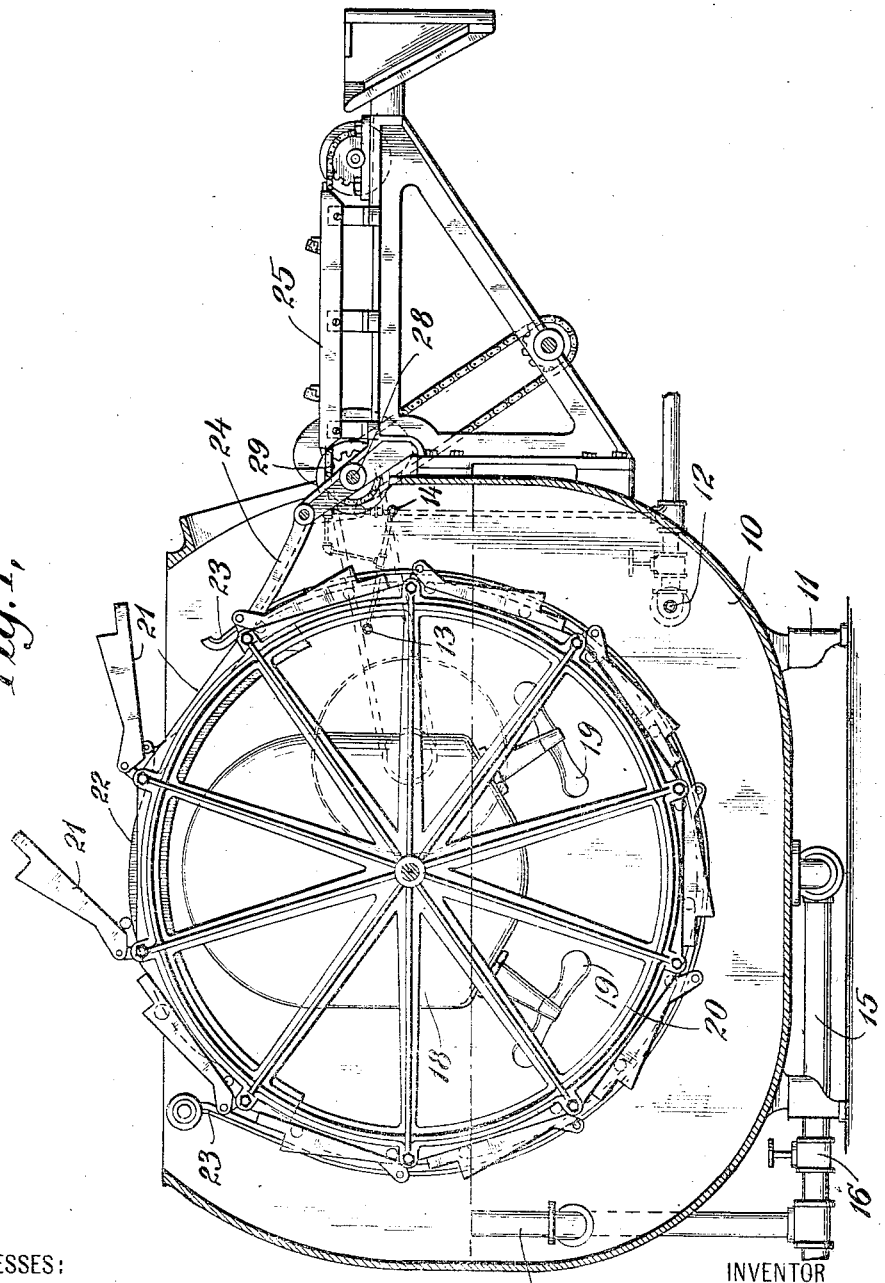

UNITED STATES PATENT OFFICE.

HARRY T. GOSS, OF RUTHERFORD, NEW JERSEY, ASSIGNOR TO CHARLES F. FROTHINGHAM, OF NEW YORK, N. Y.

DISH-WASHING MACHINE.

1,042,784. Specification of Letters Patent. Patented Oct. 29, 1912.

Application filed March 11, 1912. Serial No. 682,966.

*To all whom it may concern:*

Be it known that I, HARRY T. GOSS, citizen of the United States, and a resident of Rutherford, in the county of Bergen and State of New Jersey, have invented certain new and useful Improvements in Dish-Washing Machines, of which the following is a specification.

The invention relates to machines for washing dishes and the like; and more particularly to a machine employing a suitable tank or tanks containing the washing water and through which the dishes or the like are carried and washed. The carrier is designed to bring the dish supporting means out of the water during a part of the movement, whereby the dishes may be conveniently fed, rinsed and finally delivered from the machine.

The present invention has for its object to provide suitable means for rinsing the dishes with fresh water immediately after they leave the water of the said tank, and to so control the supply of rinsing water that there shall be no undue waste of the same. The rinsing water is employed extremely hot, and effects, therefore, a sterilization of the dishes; and, after the rinsing, is added to that in the tank 10.

The nature of the invention will best be understood when described in connection with the accompanying drawings, in which—

Figure 1 is a front elevation of the dish washing machine, the inclosing tank being in section. Fig. 2 is a rear elevation of the rinsing device and connections thereto, and of the water controlling means. Fig. 3 is a section taken on the line 3—3, Fig. 2, looking in the direction of the arrows. Fig. 4 is a detail sectional view of a spraying tube.

Similar characters of reference designate corresponding parts throughout the several views.

Referring to the drawings, 10 designates the tank wherein the dishes are to be washed and is mounted on a suitable base 11. Washing water is fed to the tank 10 through a suitable inlet 12 as well as through the spray pipes 13 and 14. A drain 15, controlled by a valve 16, is provided to remove the water from said tank; and for the purpose of maintaining the water level, as well as to remove the grease and other material floating on the surface of the water, an overflow pipe 17 may be connected with said drain beyond valve 16.

Within the tank 10 is an inwardly projecting casing 18 containing a portion of the driving mechanism (not shown); and from this casing extend downwardly into the tank two propellers 19 for washing the dishes. The dishes are brought past the propellers, which direct streams of water toward the same, by means of a rotatable wheel 20 mounted about said inwardly projecting casing and rotated by the driving mechanism, the said wheel carrying upon its periphery suitable baskets 21 to retain the dishes. These baskets are arranged to be periodically opened, by a suitable cam 22, to receive the dishes; and then to remain closed, through the action of cam 23, during their passage through the water of the tank. Immediately upon leaving the water, the dishes, still held within the baskets, are subjected upon both sides to high pressure sprays of hot water from the perforated spray pipes 13 and 14 which form a U-shape member embracing above the water a portion of the rotary carrier 20. This fresh rinsing water, under high pressure, removes from the dishes any particles which may be carried up from the surface of the washing water, and also heats the dishes to a degree sufficient to insure their drying. After passing the rinsing pipes, the dishes are removed from the rotary carrier by a cam actuated take-off frame 24 which delivers the same to a suitable carrier 25, from which the dishes are taken in any convenient manner.

To provide against undue waste of the rinsing water, which is discharged into tank 10, as well as an unnecessary overflow from said tank, means are provided to supply the rinsing water only at such times as a dish is passing between the two perforated spraying pipes. This is effected by controlling an inlet valve 26 of the feed to the spray pipes by a cam 27 suitably timed with respect to the movements of the rotatable wheel 20. Cam 27 is mounted to turn with the shaft 28, which is driven through a sprocket chain 29 from the driving mechanism of the machine. The surface of cam 27 in turn bears against a roller 30 of an arm 31 pivoted to a bracket 32 and adapted to engage a spring pressed valve stem 33. As the cam rotates, valve stem 33 is periodically forced inwardly and opens the valve 26 to effect a supply of water to the pipes 13 and 14.

I claim:—

1. In a dish washing machine: a suitable tank to contain water; means to supply the same thereto; a carrier, and means to move the same through said tank; suitable dish retaining means supported by said carrier; a spraying device embracing a portion of said carrier above the water in said tank; and means to supply water to said spraying device.

2. In a dish washing machine: a suitable tank to contain water; means to supply the same thereto; a carrier, and means to move the same through said tank; suitable dish retaining means supported by said carrier; a spraying device comprising a perforated U-shape pipe embracing a portion of said carrier above the water in said tank; and means to supply water to said spraying device.

3. In a dish washing machine: a suitable tank to contain water; means to supply the same thereto; a carrier, and means to move the same through said tank; suitable dish retaining means supported by said carrier; a spraying device embracing a portion of said carrier above the water in said tank; and means to periodically supply water to said spraying device.

4. In a dish washing machine: a suitable tank to contain water; means to supply the same thereto; a carrier, and means to move the same through said tank; suitable dish retaining means supported by said carrier; a spraying device comprising a perforated U-shape pipe embracing a portion of said carrier above the water in said tank; a valve device controlling the supply of water to said U-shape pipe; and a cam timed to the rotation of the said carrier and adapted to periodically actuate said valve device to supply water to the U-shape pipe.

Signed at New York, in the county of New York, and State of New York, this 9th day of March A. D. 1912.

HARRY T. GOSS.

Witnesses:
  EDWIN SEGER,
  ADAM SCHMIDT.